Nov. 17, 1936.  F. J. WESTROPE  2,060,916
WINDOW SUPPORT AND REGULATING DEVICE
Filed Nov. 15, 1933
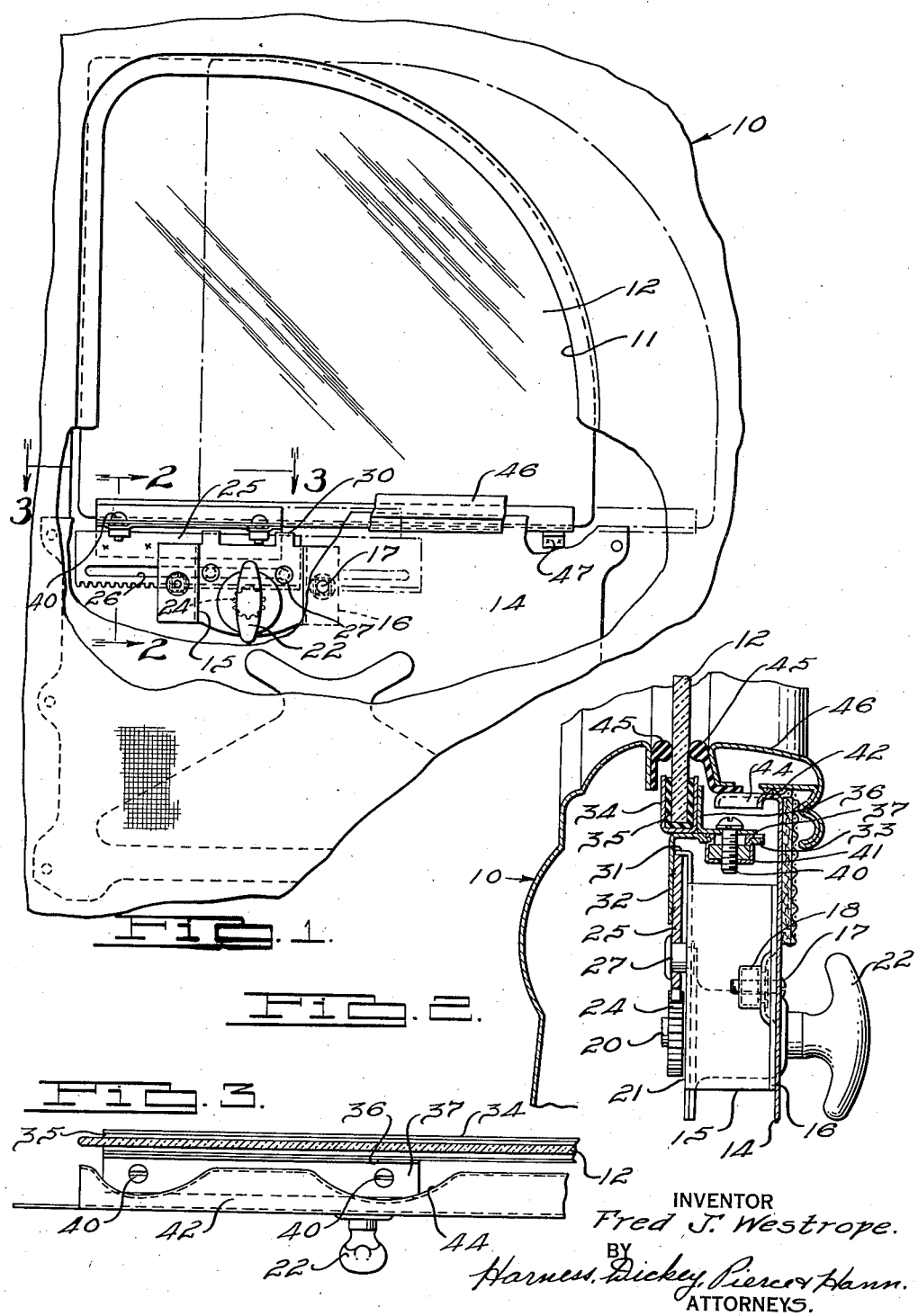
INVENTOR
Fred J. Westrope.
BY
Harness, Dickey, Pierce & Hann.
ATTORNEYS.

Patented Nov. 17, 1936

2,060,916

UNITED STATES PATENT OFFICE 2,060,916

WINDOW SUPPORT AND REGULATING DEVICE

Fred J. Westrope, Detroit, Mich., assignor to The Murray Corporation of America, a corporation of Delaware Application November 15, 1933, Serial No. 698,087

8 Claims. (Cl. 268—97)

The invention relates to closure operators and it has particular relation to window regulating mechanisms for motor vehicles.

One object of the invention is to provide an efficient regulating mechanism for horizontally movable windows in motor vehicles wherein the window will be supported entirely by the regulating mechanism.

Another object of the invention is to provide a regulator mechanism of the above mentioned character which readily permits insertion or removal of the window.

Another object of the invention is to provide a windshield regulating mechanism and vehicle body arrangement for accommodating a horizontally movable window wherein the window is entirely supported by the mechanism and by removing molding around the window the latter may be readily removed or inserted.

Other objects of the invention will become apparent from the following description, taken in conjunction with the drawing, and from the claims hereinafter set forth.

For a better understanding of the invention reference may be had to the drawing, wherein:

Figure 1 is a fragmentary view of a motor vehicle body with parts broken away illustrating a window regulating and supporting mechanism constructed according to one form of the invention.

Fig. 2 is a cross-sectional view on a larger scale, taken substantially along the line 2—2 of Fig. 1.

Fig. 3 is a cross-sectional view on a larger scale, taken substantially along the line 3—3 of Fig. 1.

Referring to the figures, the vehicle body is indicated at 10, the window opening at 11 and the window at 12. The window is of the horizontally movable type and movable from the full line closed position shown in Fig. 1 to the open and broken line position.

The regulating and supporting mechanism is mounted on a plate 14 that is secured to the body 10 in any suitable way well understood in the art. On the outer side of this plate a U-shaped bracket 15 is provided which has flange or leg portions 16 secured to the plate 14 by screws 17 threaded through sheath nuts 18. An operating pin 20 rotatably projects through the plate 14 and through the base portion indicated at 21 of the bracket 15 and a handle 22 is provided on the pin for rotating it. A pinion 24 mounted on the pin at the inner side of the bracket meshes with a rack plate 25 which is slidably mounted on the base portion 21 of the bracket by means of an elongated slot 26 shown best by Fig 1, and spaced pins 27 projecting through the slot and having heads at the inner side of the bracket and outer side of the rack plate, respectively. Thus, by turning the handle 22 the rack plate may be reciprocated while being maintained in a horizontal position by the slot 26 and the pins 27.

For further insuring smooth movement of the rack plate, angular lips 30 project upwardly from the base portion 21 of the bracket 15 and are bent over the upper edge of the rack plate as indicated at 31. The outer side of the rack plate has a plate 32 welded thereto and this plate terminates at its upper edge and above the rack plate in an angular flange 33 which is disposed under the window. The window is mounted in a metal channel 34 which preferably also has a rubber channel 35 therein for directly receiving the glass and at the inner side of the channel 34 a metal plate 36 is spot welded thereto. This plate 36 terminates in a flange 37 that extends along the flange 33 and in this connection it may be noted that the base of the channel 34 and the flange 37 on the window rest on the flange 33 and, accordingly, are supported thereby. The flange 37 is releasably secured to the flange 33 by screws 40 which are threaded into sheath nuts mounted in openings in the flange 33. It will be apparent from this description that the channel carrying the glass 12 is secured to the flange 33 and rests thereon and, since the flange 33 is positively connected to the rack plate 25, the mechanism directly and entirely supports the window and when the rack plate is moved the window will move therewith in a horizontal direction.

I have illustrated a supporting element 41 at the rear end of the window to prevent the sagging of the end in case the bolts 40 become loose, and to support the end when the window is installed. The window, however, does not normally engage the element but is preferably entirely carried by the actuating mechanism.

The mounting plate 14 at its upper edge terminates in an outwardly directed flange 42 which, as best shown by Fig. 3, has cut-out portions 44 at spaced intervals which are so arranged that the screws 40 may be exposed for removal when the window is to be inserted or removed. The inner side of the glass is sealed by means of weather stripping 45 that is held in place and against the flange 42 on the mounting plate and against other portions of the body around the vertical side and upper side of the glass by means of a molding frame 46 which is usually held in place by removable screws. Similar weatherstripping may be provided around the outside edge of the window.

From this description it is apparent that the window is entirely carried by the regulating mechanism, thus eliminating any direct support on the body proper. Furthermore, it is apparent that the window may be readily inserted after the mounting plate and regulating mechanism thereon are disposed and fastened in place as this may be readily accomplished with the molding frame 46 not yet inserted. In the event it is desired at any time to replace the window, it is only necessary to remove the molding frame 46 and weatherstripping 45, release the screws 40 and remove the window and its channel support by tilting it toward the interior of the vehicle and lifting it.

Although only one form of the invention has been described and illustrated, it will be apparent to those skilled in the art that various modifications may be made without departing from the scope of the appended claims.

I claim:

1. A vehicle body having a window opening, a window movable horizontally of the opening, and window regulating mechanism on the body for moving the window, said mechanism including horizontally movable means entirely supporting the window against downward movement.

2. In combination, a vehicle body having a window opening, a window movable horizontally of the opening, a horizontally movable member mounted on the body and engaging the lower edge of the window and constituting the sole support therefor to prevent its downward movement, and means for moving said member.

3. In combination, a vehicle body having a window opening, a window movable horizontally of the opening, a horizontally movable rack plate mounted on the body and operatively engaging the lower edge of the window and constituting the sole support therefor to prevent downward movement thereof, and pinion means for moving the rack plate.

4. In combination, a vehicle body having a window opening, a window movable horizontally of the opening, a channel member receiving the lower edge of the window, a horizontally movable member for moving the window, means forming flanges on said members offset laterally of the plane of the channel, and means releasably holding the flanges for movement together.

5. In combination, a vehicle body having a window opening, a window movable horizontally of the opening, a channel member receiving the lower edge of the window, a rack plate, means mounting the rack plate on the body for movement horizontally, means operatively connecting the rack plate and channel so that the plate supports the channel, and pinion means for moving the rack plate.

6. In combination, a vehicle body having a window opening, a window movable horizontally of the opening, a mounting plate below the opening, a pin rotatably mounted on the plate, a pinion on the pin, a rack plate meshing with the pinion, means for guiding and supporting the rack plate on the mounting plate for horizontal movement, and means mounting the window on the rack plate so that the latter entirely supports the window during movement of the latter.

7. In combination, a vehicle body having a window opening, a window movable horizontally of the opening, a mounting plate below the opening, a pin rotatably mounted on the plate, a pinion on the pin, a rack plate meshing with the pinion, means for guiding and supporting the rack plate on the mounting plate for horizontal movement, a channel member for receiving the lower edge of the window, and means including screw threaded means releasably fastening the channel member to the rack plate.

8. In combination, a vehicle body having a window opening, a window movable horizontally of the opening, a mounting plate below the opening, a pin rotatably mounted on the plate, a pinion on the pin, a rack plate meshing with the pinion, means for guiding and supporting the rack plate on the mounting plate for horizontal movement, a channel member for receiving the lower edge of the window, and means including screw threaded means releasably fastening the channel member to the rack plate, said screw threaded means being disposed vertically at one side of the window so as to permit ready access thereto.

FRED J. WESTROPE.